United States Patent
Lee et al.

[11] Patent Number: 5,929,218
[45] Date of Patent: Jul. 27, 1999

[54] PYRIDONE-BASED YELLOW MONOAZO DYE FOR USE IN THERMAL TRANSFER AND INK COMPOSITIONS COMPRISING SAME

[75] Inventors: Ki Taek Lee, Namyangju; Young Seup Son, Seoul; Woo Sok Han, Namyangju; Beom Jun Joo, Guri; Soon Yeol Eom, Seoul, all of Rep. of Korea

[73] Assignee: Hansol Paper Co., Ltd., Seoul, Rep. of Korea

[21] Appl. No.: 08/646,968

[22] Filed: May 8, 1996

Related U.S. Application Data

[51] Int. Cl.$^6$ .......................... C09B 29/42; C09D 11/00; C09D 11/02
[52] U.S. Cl. ..................... 534/772; 106/20 R; 106/21 D; 106/22 R; 106/23 R
[58] Field of Search .......................... 534/772; 106/21 R, 106/21 D, 22 R, 23 R

[56] References Cited

U.S. PATENT DOCUMENTS

| | | | |
|---|---|---|---|
| 3,956,263 | 5/1976 | Buehler et al. | 534/772 X |
| 4,116,953 | 9/1978 | Dimroth et al. | 534/772 X |
| 4,247,456 | 1/1981 | Von Brachel et al. | 534/772 |

(List continued on next page.)

FOREIGN PATENT DOCUMENTS

| | | |
|---|---|---|
| 0 302 627 A2 | 2/1989 | European Pat. Off. . |
| 0 442 466 A1 | 8/1991 | European Pat. Off. . |
| 0 462 447 A1 | 12/1991 | European Pat. Off. . |

(List continued on next page.)

*Primary Examiner*—Floyd D. Higel
*Attorney, Agent, or Firm*—Finnegan, Henderson, Farabow, Garrett & Dunner, L.L.P.

[57] ABSTRACT

The present invention relates to pyridone-based yellow monoazo dyes used in thermal transfer having following formula(I) which have good stability and hue.

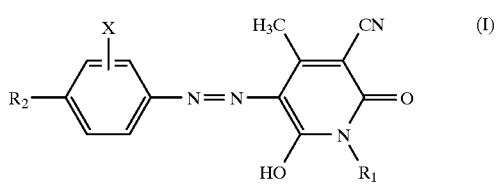

wherein, $R_1$ is hydrogen atom; unsubstituted or substituted alkyl group of from 1 to 8 carbon atoms with alkoxy or aryl; or unsubstituted or sustituted aryl group with alkoxy or halogen.

And,

X is hydrogen atom; alkyl group of from 1 to 4 carbon atoms; alkoxy group; or halogen;

$R_2$ is selected from the following groups;

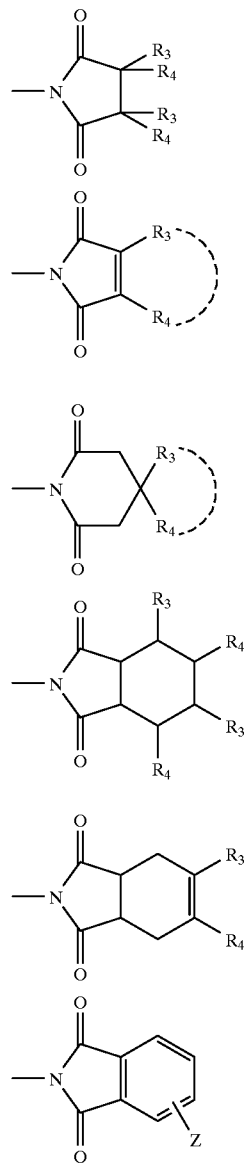

wherein, $R_3$ and $R_4$ are independently selected from groups consisting hydrogen, substituted or unsubstituted alkyl group of from 1 to 4 carbon atoms, halogen, alkyl carboxylate, and carbonyl group;

$R_3$–$R_4$ is noncyclization with $R_3$ and $R_4$ and selected respectively from the above substituents($R_3$ and $R_4$); or saturated or unsaturated cycloalkyl of from 3 to 6 carbon atoms, Z is nitro, halogen, alkyl group of from 1 to 4 carbon atoms, alkoxy, sulfonyl, carbonyl, carboxyamide, sulfonamino, cyano, hydroxy or hydrogen atom.

7 Claims, No Drawings

U.S. PATENT DOCUMENTS

| | | | |
|---|---|---|---|
| 4,380,452 | 4/1983 | Loeffler et al. | 8/532 |
| 4,632,983 | 12/1986 | Lamm | 534/772 |
| 4,695,287 | 9/1987 | Evans et al. | 8/471 |
| 4,698,651 | 10/1987 | Moore et al. | 503/227 |
| 4,701,439 | 10/1987 | Weaver et al. | 503/227 |
| 4,764,178 | 8/1988 | Gregory et al. | 8/471 |

FOREIGN PATENT DOCUMENTS

| | | | |
|---|---|---|---|
| 2247654 | 4/1974 | Germany | 534/772 |
| 2322008 | 11/1974 | Germany | 534/772 |
| 59-78894 | 5/1984 | Japan . | |
| 59-227948 | 12/1984 | Japan . | |
| 3-61085 | 3/1991 | Japan . | |

PYRIDONE-BASED YELLOW MONOAZO DYE FOR USE IN THERMAL TRANSFER AND INK COMPOSITIONS COMPRISING SAME

BACKGROUND OF THE INVENTION

1. Technical Field

The present invention relates to pyridone-based yellow monoazo dye used in thermal dye transfer in particular, which has good color and durability, and is substituted to imido group.

2. Description of Related Prior Art

In recent years, thermal transfer systems have been used in machinary such as facsimile and copying press. Furthermore it has been developed to obtain prints from pictures which have been generated electronically from a color video camera or computer. According to one way of obtaining such prints, sublimable thermal transfer system has been proposed.

According to thermal transfer system, an electronic picture is first subjected to color separation by color filters. The respective color-separated images are then converted into electrical signal. These signals are then operated on producing Y(Yellow), M(Magenta) and C(Cyan) electrical signals. These signals are then transmitted to a thermal printer.

Transfer sheet applying thermal transferable yellow, magenta and cyan dyes as ink type on sheet-phased substrate is contacted with receiving sheet and then inserted between thermal printing head(TPH) and a platen roller. TPH has many heating elements and is heated up sequentially in response to the yellow, magenta and cyan signals. Transfer sheet is heated selectively according to signal of pattern information corresponding to one color. Dye is transferred to receiving layer from region heated selectively, wherein pattern is formed as form and concentration according to pattern and strength of heat applyed to transfer sheet. The process is then repeated for the other two colors, and then color print corresponding to the original pictures is obtained by combination of three color elements.

Dyes used in sublimable thermal transfer system satisfy some condition. That is, such dyes (1) are sublimated easily and are not decomposed thermally under operating condition of TPH; (2) have a large molar extinction coefficient; (3) have good stability against light, moisture, heat and drug; (4) have good hue at color regeneration; and (5) have simpleness of synthesis.

Dyes used in thermal transfer are disclosed in the following references; U.S. Pat. No. 4,698,651 relates to magenta-dyes having substituted 5-arylazoisothiazole structure.

And U.S. Pat. No. 4,701,439 relates to yellow dyes having cyanovinyl tetrahydro quinoline structure.

U.S. Pat. No. 4,695,287 relates to cyan-dyes having 2-carbamoyl-4-[N- (p-substituted monoaryl)-imino]-1,4-naphtoquinone structure.

Also, U.S. Pat. No. 4,764,178 relates to azo dyes having diazoficationable hetero aromatic amines and aromatic coupling components.

Japanese Patent Unexamined Publication No. Soh. 59-78894 relates to cyan-dyes having naphthalendione structure. Japanese Patent Unexamined Publication No. Soh. 59-227948 relates to cyan-dyes having antraquinone structure.

However, dyes described above cannot satisfy the above requirements for thermal transfer system.

Accordingly, dyes with improved color characteristics such as hue, and degree of color development and stability against light and heat are required.

The following reference disclose attempts provide yellow-dyes with the above mentioned improved, U.S. Pat. No. 5,011,813 discloses pyridone-based azo dyes having the following structure;

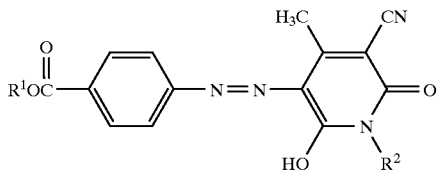

wherein, $R^1$ is aryl; a substituted or unsubstituted alkoxy alkyl or aryl alkyl group of from 1 to 4 carbon atoms, $R^2$ is an alkyl group of from 1 to 12 carbon atoms.

Similarly, European Patent No. 442466 discolses pyridon-based azo dyes having following structure;

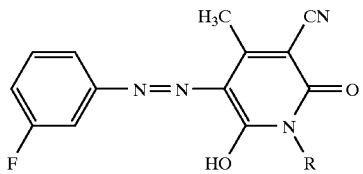

wherein,

R is hydrogen atom, alkyl, cycloalkyl, substituted or unsubstituted phenyl group.

However, yellow dyes of these two pyridone-based azo compounds do not have sufficiently good stability and hue.

SUMMARY OF THE INVENTION

The object of the present invention is to provide dyes used in thermal transfer having good stability and hue.

DETAILED DESCRIPTION OF THE INVENTION

The present invention relates to pyridone-based yellow monoazo dyes used in thermal transfer having following formula(I).

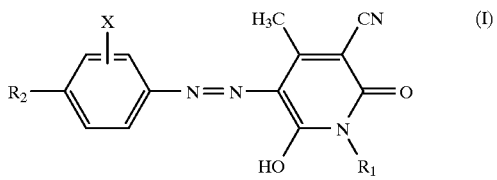

(I)

wherein, $R_1$ is hydrogen atom; unsubstituted or substituted alkyl group of from 1 to 8 carbon atoms with alkoxy or aryl etc.; or unsubstituted or sustituted aryl group with alkoxy or halogen;

X is hydrogen atom; alkyl group of from 1 to 4 carbon atoms; alkoxy group; or halogen; and $R_2$ is selected from group as followings;

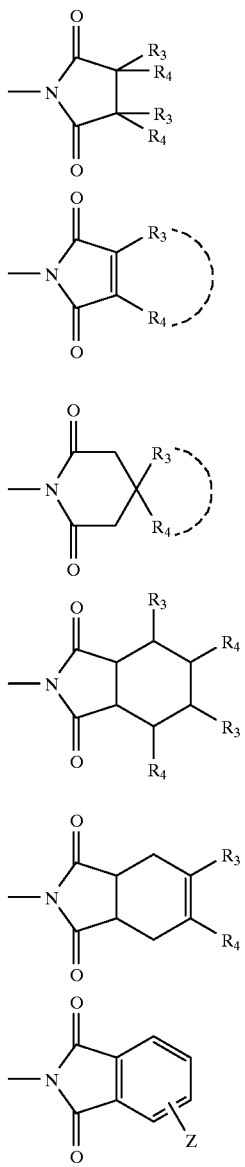

wherein, $R_3$ and $R_4$ are independently selected from groups consisting hydrogen, substituted or unsubstituted alkyl group of from 1 to 4 carbon atoms, halogen, alkyl carboxylate, and carbonyl group;

$R_3$ –$R_4$ is noncyclization with $R_3$ and $R_4$ and selected respectively from the above substituents($R_3$ and $R_4$); or saturated or unsaturated cycloalkyl of from 3 to 6 carbon atoms, Z is nitro, halogen, alkyl group of from 1 to 4 carbon atoms, alkoxy, sulfonyl, carbonyl, carboxyamide, sulfonamino, cyano, hydroxy or hydrogen atom.

Examples of compounds according to the present invention are as followings;

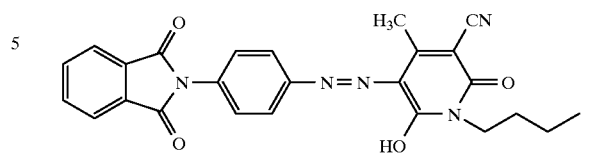

$Y_1$

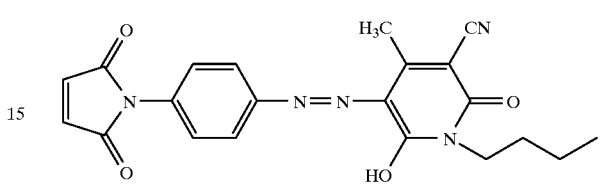

$Y_2$

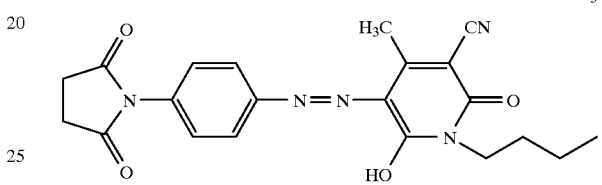

$Y_3$

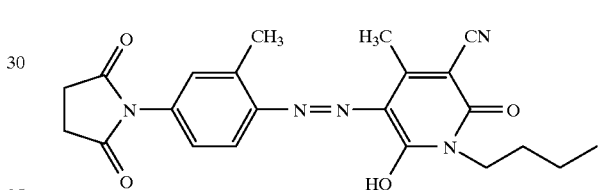

$Y_4$

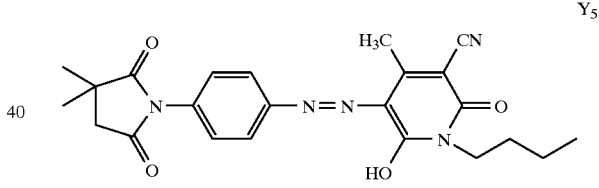

$Y_5$

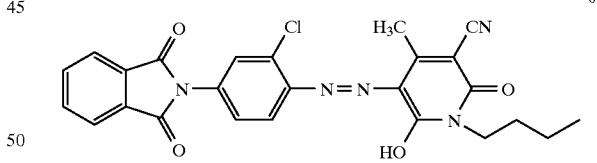

$Y_6$

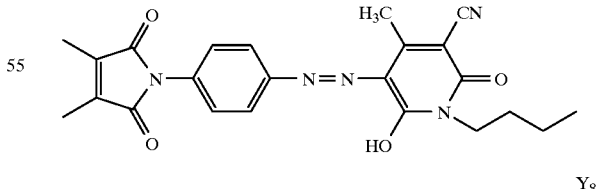

$Y_7$

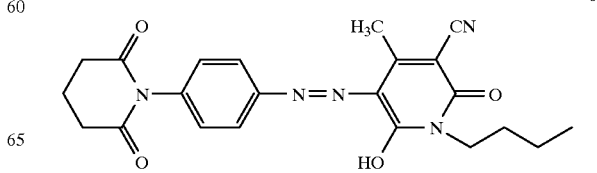

$Y_8$

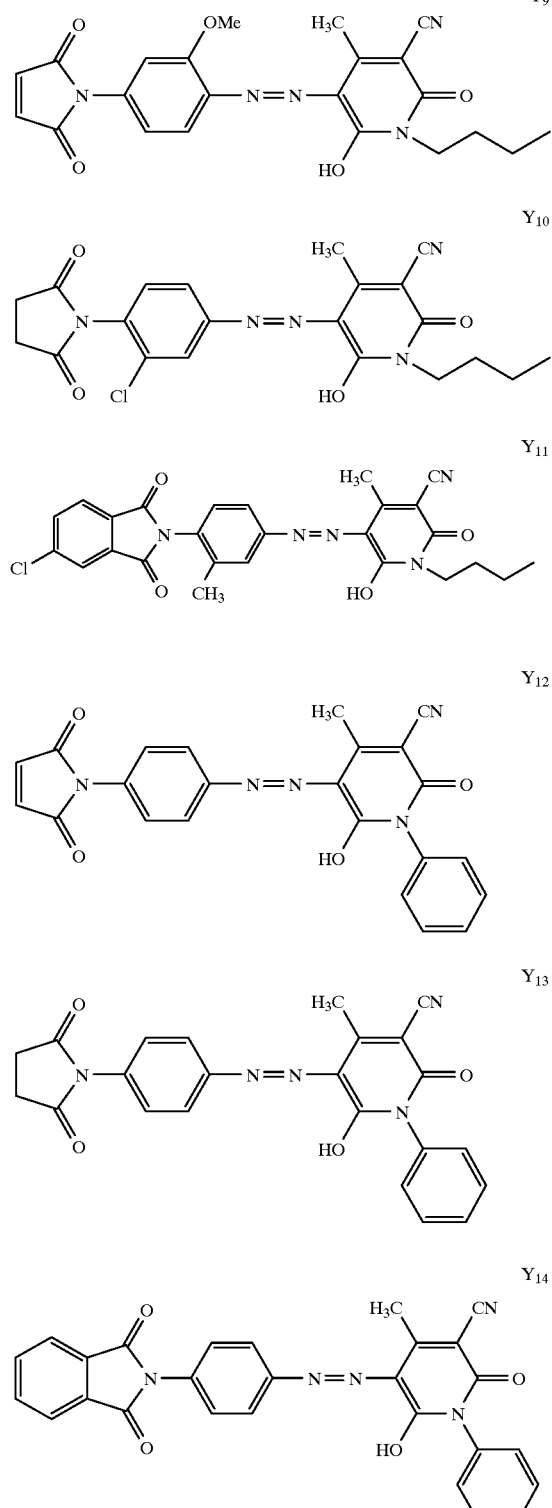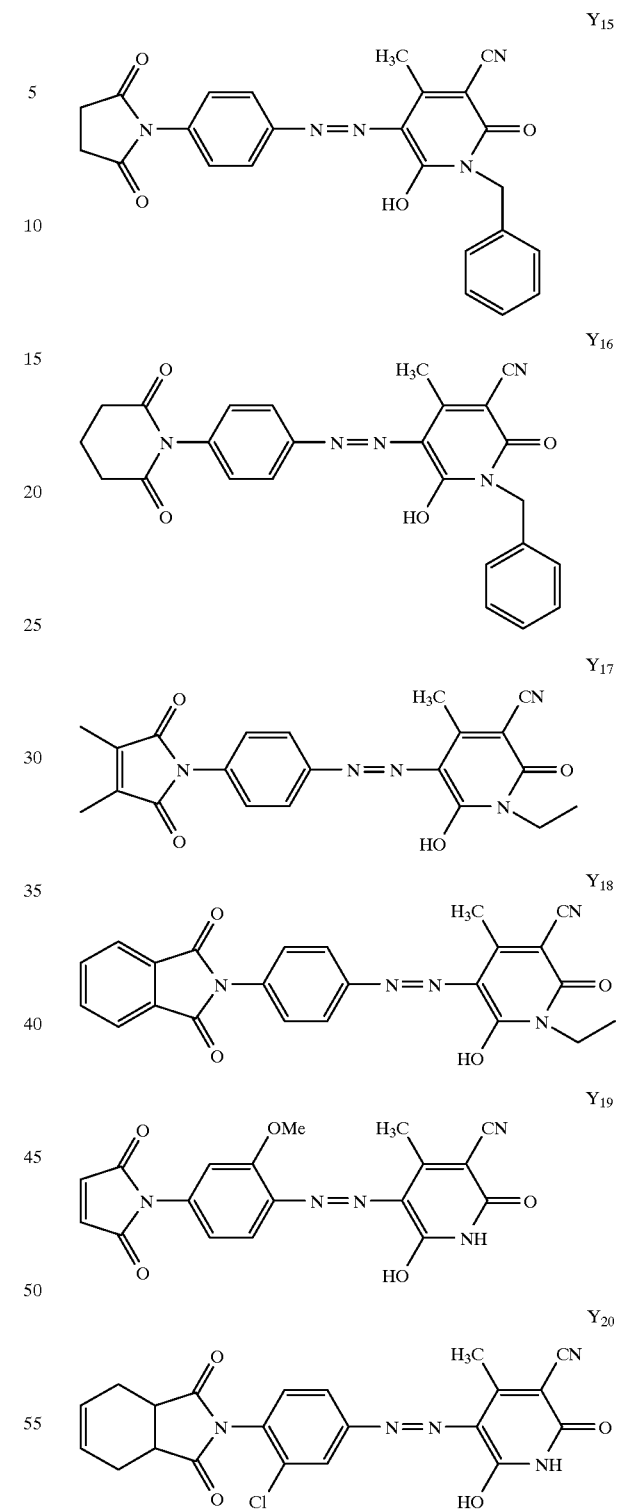
Among the compounds represented by formula(I), compounds in which $R_1$ is alkyl group of from 1 to 4, carbon atoms X is hydrogen atom and $R_2$ is succinimido, maleimido or phthalimido have a better degree of color development than the others.

To provide ink composition used in thermal transfer, dyes and binders are dispersed and dissolved in organic solvents. Then, to prepare transfer sheet, this is spread on the substrate. Transfer sheet spread with dyes is contacted with receiving sheet in order to be closed dyes to receiving sheet.

And then, the back of transfer sheet is heated and pressed selectively, and dyes are transferred selectively to obtain desirable screen record on receiving sheet.

Ink composition containing dye compounds of the present invention preferably comprises 2~8 wt % of the dye represented by formula(I), 2~8 wt% of binder and 84~96 wt % of organic solvents.

If the content of dyes is less than 2 wt %, concentration of transferred dyes is low and degree of color development is decreased. If the content of dyes is more than 8 wt %, it gives rise to solubility and economics.

If the content of binder is less than 2 wt %, desertion of dyes on or after spreading occurs because viscosity of the composition is low and adhesion is decreased. If the content is more than 8 wt %, the process of spreading becomes difficult due to high viscosity, spreading layer is nonumiform and transfer of dyes is difficult.

The binder used in the above ink composition may be any resinous or polymeric material suitable for binding the dyes to the substrate. Examples of binders include cellulose derivatives, such as ethylcellulose, hydroxyethylcellulose, methylcellulose and cellulose acetate butyrate; vinyl resins and derivatives, such as polyvinyl alcohol, polyvinyl acetate, polyvinyl butyral and polyvinyl acryl amide; polyacrylic acid; polymethyl metha-crylate; poly carbonate; polysulfone; and polyphenylene oxide.

Organic solvents used in ink composition include methyl alcohol, ethyl alcohol, toluene, methylethyl ketone, cyclohexane or N, N-dimethylformamide.

The above ink composition may be included another additives such as hardener and preservatives.

The ink composition is coated on the substrate and formed dye-layer of which thickness is 0.4~2 μm preferably. The substrate for transfer sheet may be any sheet material preferably having at least one smooth even surface and capable of with standing the temperatures involved, i. e. up to 400° C., for periods up to 20 msec, yet thin enough to transmit heat applied on one side through to the dyes on the other side to effect transfer of the dye on to a receiver sheet within 10 msec. Examples of suitable materials are polyester such as poly(ethylene terephthalate), polyamides, polyacrylates, polycarbonates, cellulose esters, fluorine-based resins and polyacetals.

Thickness of the substrate is preferably 2~15 μm. If thickness of the substrate is thiner than 2 μm, substrate film is distorted on contacting with TPH of high temperature. If the thickness is thicker than 15 μm, sensitivity of thermal transfer is decreased due to low heat transmition.

The reverse side of receiving sheet may be coated with slipping layer to prevent TPH from sticking to film. Such a slipping layer would comprise carboxylates, sulfonates, phosphates, aliphatic amines, polyoxyethylene alkylesters, polyethyleneglycol fatty acid esters, silicon oils or synthetic oils.

Between the substrate film and dye-layer, dye-preventing layer may be formed to prevent dye from thermal transfering to the substrate. Examples of materials used in dye-preventing layer include hydrophilic polymers such as polyacrylamide, butylmethacrylate, polyvinylalcohol or polyvinyl acetate.

Generally receiving sheet includes the substrate having dye-receiving layer thereon. The substrate for receiving sheet include poly(ethylene terephthalate), polyester sulfone, polyamides, cellulose esters, polyesters coated with white dye, or synthetic papers. Dye-receiving layer is coated on the substrate in order transmited dyes is absorbed and spread very well. Examples of dye-receiving layer include polycarbonates, polyurethanes, polyesters, polyamides, polyvinyl chlorides, styrene-acrylonitrile copolymers or polycaprolactam.

Dye-receiving layer preferably includes lubricating materials such as a wax or silicon oil in order that seperation of layer after dye-transfering is smooth.

The following examples are provided to illustrate the invention.

EXAMPLE 1

1) Synthesis of compound $Y_1$

4-Phthalimidoaniline(1 mmol) was dissolved in 0.2 ml of conc. HCl and temperature was lower to 0° C. Sodium nitrite(1 mmole) in water was added dropwisly to the solution at 0° C. The following pyridone-based compound 1, (1 mmol) was dissolved in 3 ml of water, the above solution was added dropwisly and stirred for 30 minutes.

To obtain compound $Y_1$ (0.8 mmol, 80 %) yellow precipitate was filtered, washed in water and dried at vacuum.

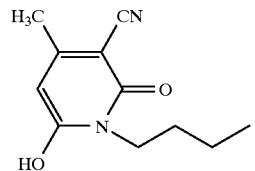

(1)

2) Preparation of ink composition

To prepare ink composition, 4 wt % of compound $Y_1$ prepared by the above-mentioned synthesizing process and 4 wt % of BX-5 polybutyral resin were dispersed and dissolved in 96 wt% of methylethyl ketone at 50° C., and then cooled.

3) Preparation of transfer sheet

To prepare transfer sheet, the prepared ink composition was coated on poly(ethylene terephthalate) film sheet (thickness; 7 μm) using bar coater to have 1 g/m² of dry coat and dried.

EXAMPLE 2~8

To prepare transfer sheet, instead of compound $Y_1$ of Example 1, compounds represented at Table 1 were used and carried out according to method of Example 1.

COMPARATIVE EXAMPLE 1

To prepare transfer sheet, instead of compound $Y_1$ of Example 1, compound represented as following formula(A) was used and carried out according to method of Example 1.

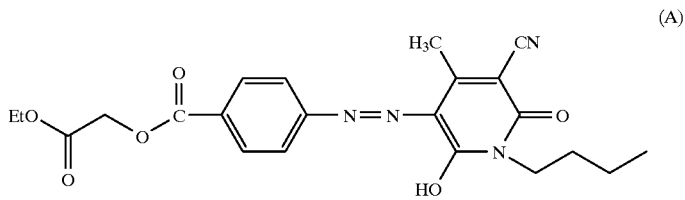

(A)

COMPARATIVE EXAMPLE 2

To prepare transfer sheet, instead of compound $Y_1$ of Example 1, compound represented as following formula(B) was used and carried out according to method of Example 1.

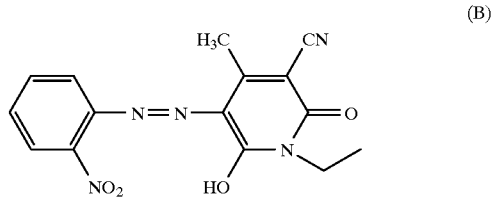

(B)

About transfer sheet prepared by Example 1~8 and Comparative Example 1 and 2 degree of color development and stability were estimated by following method. The results were as following Table 1.

1) Estimation of degree of color development

TH-FMR was set up as follows; voltage supplied of TPH was 22 V representing 1.5 watts/dot. Using the TH-FMR, transfer sheet prepared by Examples or Comparative Examples and receiving sheet(Sony, UPC 3010), degree of color development was estimated. Concentration of color development was estimated by densitometer(TR 1224).

2) Estimation of stability

Receiving sheet having dye-transfering phase formed from transfer sheet prepared by Examples and comparative Examples was left at 35±2° C. 60±2° C. RH for 48 hours using Xenon weathermeter(Atlas, ES 25). Decreasing of concentration in period of this was estimated by densitometer.

TABLE 1 coloring conc. and durability according to thermal transfer ink dye.

| section | formula | coloring conc. | decreasing of coloring conc. (%) |
|---|---|---|---|
| Example 1 | | 2.19 | 8.9 |
| Example 2 | | 2.15 | 8.5 |
| Example 3 | | 2.21 | 8.0 |

TABLE 1-continued coloring conc. and durability according to thermal transfer ink dye.

| section | formula | coloring conc. | decreasing of coloring conc. (%) |
|---|---|---|---|
| Example 4 | | 1.99 | 9.5 |
| Example 5 | | 1.98 | 9.0 |
| Example 6 | | 2.02 | 10.1 |
| Example 7 | | 2.24 | 8.9 |
| Example 8 | | 1.99 | 11.0 |
| Comp. Example 1 | | 1.92 | 13.0 |
| Comp. Example 2 | | 1.81 | 14.5 |

As shown in the Table 1, respect to comparative dye having simlilar structure dyes represented as formula(I) were good or allowable hue and good stability.

What is claimed is:

1. A Pyridone-based yellow monoazo dye compound of formula (I)

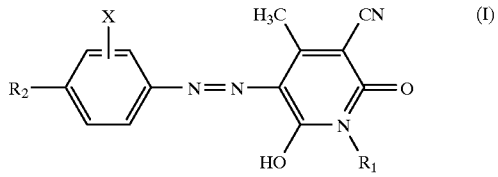

wherein, $R_1$ is hydrogen, $C_1-C_8$ alkyl group unsubstituted or substituted with alkoxy or aryl, or aryl unsubstituted or substituted with alkoxy or halogen;

X is hydrogen $C_1-C_4$ alkyl, alkoxy, or halogen; and $R_2$ is selected from the following groups:

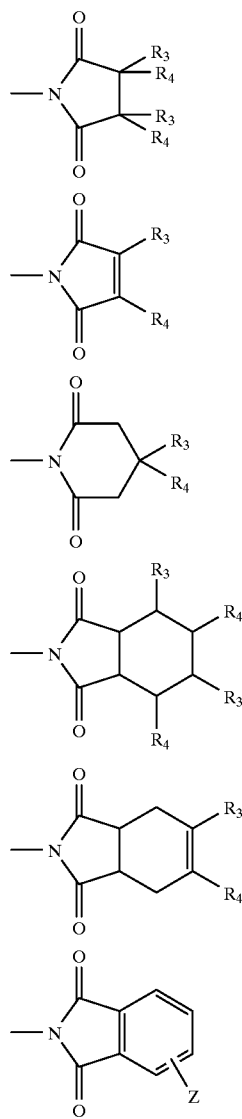

wherein, $R_3$ and $R_4$ are independently hydrogen, substituted or unsubstituted $C_1-C_4$ alkyl, halogen, alkyl carboxylate, or carbonyl; and Z is nitro, halogen, $C_1-C_4$ alkyl, alkoxy, sulfonyl, carbonyl, carboxyamide, sulfonamino, cyano, hydroxy or hydrogen.

2. The pyridone-based yellow monoazo dye of claim 1, wherein $R_1$ is hydrogen, $C_1-C_8$ alkyl phenyl, or benzyl.

3. The pyridone-based yellow monoazo dye of claim 1, wherein X is hydrogen, o-halo, o-alkoxy, or m-alkyl.

4. The pyridone-based yellow monoazo dye of claim 1, wherein $R_2$ is succinimido, maleimido, or phthallimido.

5. The pyridone-based yellow monoazo dye of claim 1, wherein $R_3$ and $R_4$ are independently methyl or ethyl.

6. The pyridone-based yellow monoazo dye of claim 1, wherein Z is acetamido, nitro, halogen or hydrogen.

7. A Pyridone-based yellow monoazo dye composition comprising a compound of formula (I)

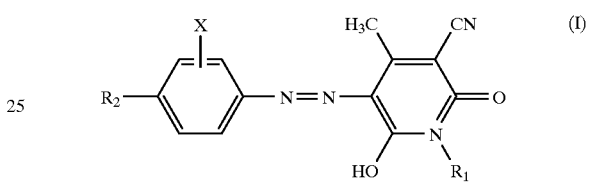

wherein, $R_1$ is hydrogen, $C_1-C_8$ alkyl group unsubstituted or substituted with alkoxy or aryl, or aryl unsubstituted or substituted with alkoxy or halogen;

X is hydrogen $C_1-C_4$ alkyl, alkoxy, or halogen; and $R_2$ is selected from the following groups:

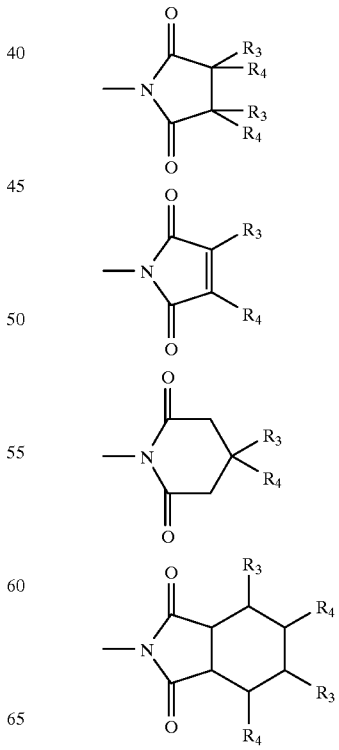

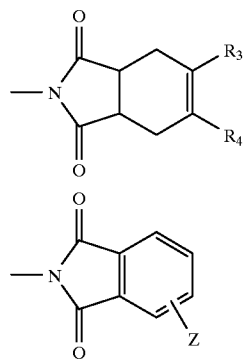
wherein,
R₃ and R₄ are independently hydrogen, substituted or unsubstituted $C_1$–$C_4$ alkyl, halogen, alkyl carboxylate, or carbonyl; and
Z is nitro, halogen, $C_1$–$C_4$ alkyl, alkoxy, sulfonyl, carbonyl, carboxyamide, sulfonamino, cyano, hydroxy or hydrogen.
* * * * *

UNITED STATES PATENT AND TRADEMARK OFFICE
CERTIFICATE OF CORRECTION

PATENT NO.: 5,929,218

DATED: July 27, 1999

INVENTOR(S): Lee et al.

It is certified that an error appears in the above-identified patent and that said Letters Patent is hereby corrected as shown below:

CLAIM 2, Col. 14, L. 9 "alkyl phenyl" should read --alkyl, phenyl--.

CLAIM 4, Col. 14, L. 13 "phthallimido" should read --phthalimido--.

Signed and Sealed this

Twenty-fifth Day of January, 2000

Attest:

Attesting Officer

Acting Commissioner of Patents and Trademarks